July 4, 1950 — E. M. WINEGAR ET AL — 2,513,541
GUIDE FOR RUBBER MILLS
Filed Feb. 1, 1946 — 2 Sheets-Sheet 1

INVENTORS
EDMUND M. WINEGAR and
ANTHONY P. GROVER
BY
Oberlin & Limbach
ATTORNEYS July 4, 1950 E. M. WINEGAR ET AL 2,513,541
GUIDE FOR RUBBER MILLS
Filed Feb. 1, 1946 2 Sheets-Sheet 2

INVENTORS
EDMUND M. WINEGAR and
ANTHONY P. GROVER
BY
Oberlin & Limbach
ATTORNEYS Patented July 4, 1950

2,513,541

UNITED STATES PATENT OFFICE 2,513,541

GUIDE FOR RUBBER MILLS

Edmund M. Winegar, Willoughby, and Anthony P. Grover, Wickliffe, Ohio, assignors, by mesne assignments, to The Ohio Rubber Company, Willoughby, Ohio, a corporation of Delaware Application February 1, 1946, Serial No. 644,698

13 Claims. (Cl. 18—2)

The present improvements, while referred to as guides for rubber mills, apply generally to the means employed in connection with mills of the roll type, such as mixing mills, calenders, refiners, etc., to properly guide the material, such as rubber, plastic or the like, that is being processed through between such rolls and to prevent the same from escaping beyond their ends and so being damaged or wasted. The means in question are designed equally to guard the bearings of the rolls against the entrance therein of such material and resulting gumming-up, if not actual damage to the bearings. It will be understood of course that the present improved guide or guard means are not limited to use in the rolls or roll mills employed in the processing of rubber, i. e. their use and the advantages resulting therefrom are not limited to the particular material that is being milled.

One principal object of the invention is to provide guides or guards for mills of the type in question which may be readily applied to and removed from rolls. A further and equally important object is to so mount such guides as to insure at all times close fitting contact between the same and the rolls despite bearing wear in the journal boxes of the latter and despite relative displacement of the latter due to the passage between the same of the material being processed. Furthermore, since such rolls, as indicated, are for obvious reasons employed in pairs, a further object is to provide guides which will provide a complete closure between the rolls and yet permit the degree of flexure necessary to avoid breakage of either the guides or the mountings whereby they are supported.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
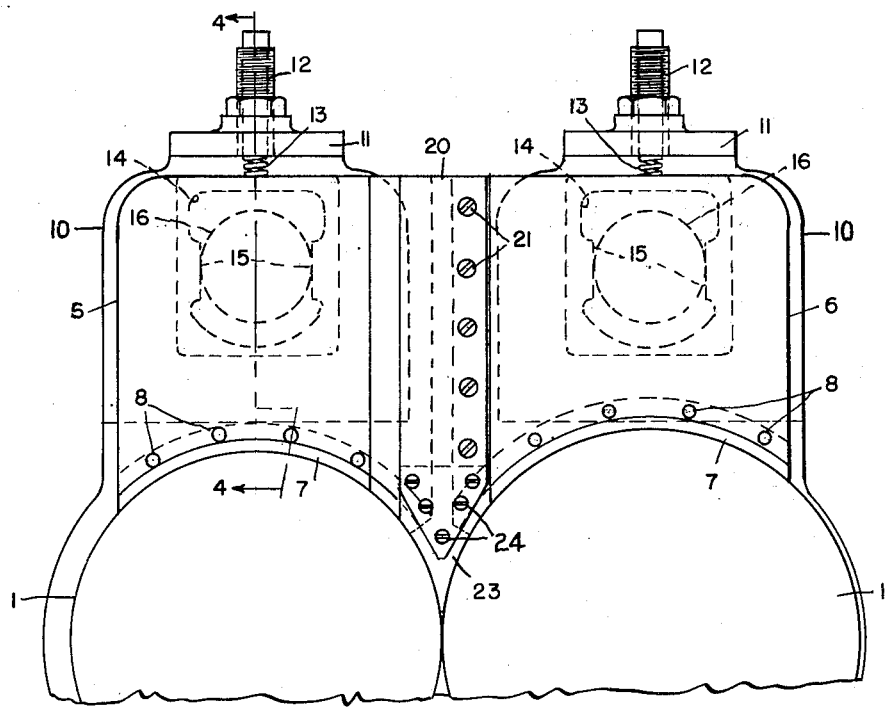
Fig. 2 is a side elevation of such guides thus applied as viewed from below in Fig. 1, i. e. in the direction indicated by section line 2—2.

As previously indicated, the present improved guides will generally be employed in pairs, being fitted to correspondingly paired rolls 1, 1, as shown in Figs. 1 to 4 inclusive of the drawings. Since for the most part the elements which enter into the respective guides and the mountings therefor are duplicates, the same reference numerals will be applied thereto. The ends 2, 2 of the rolls, as usual, are shown (see Figs. 3 and 4) as of reduced diameter or necked and are journalled in journal boxes 3 in a frame or housing 4 so as to permit of relative transverse displacement of the rolls. In other words, while in Figs. 1 and 2 the latter are shown as closely contacting, it will be understood that in operation when a batch of material such as a mixture of rubber stock and ingredients that are being compounded therewith is passed through between the rolls they will necessarily be moved apart, such movement being regulated by adjusting screws (not shown), or like means, suitably applied to their respective journal boxes in the housing 3.

Figure 1:
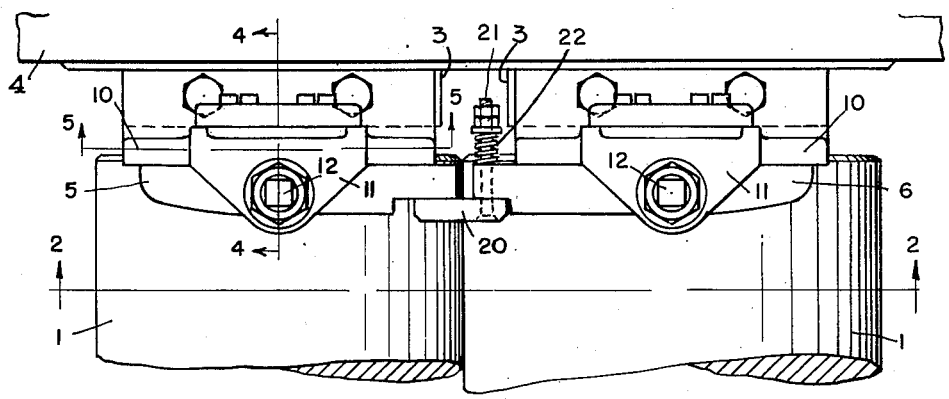
Fig. 1 is a top plan view of the adjacent ends of a pair of rolls such as used in a rubber mill, showing our improved guides applied thereto.

The guide plates 5 and 6 are identical in form and construction except that the one is right handed whereas the other is left handed. In other words, each comprises a plate, preferably in the form of a casting, with a smooth inwardly directed face, the outwardly directed edge of which is bevelled or rounded as shown in Fig. 1 while the inwardly directed edge is recessed or rabbeted for a purpose which will be presently explained. The opposite face of each plate will desirably be cast with ribs so as to provide the necessary strength with the use of a minimum amount of metal. The lower edge of each plate is curved to conform approximately with the cylindrical surface of the corresponding roll 1 and carries an arcuate shoe in the form of a strip 7 which in the operative position of the plate directly contacts and closely fits such roll. This strip will desirably be firmly locked to the plate by casting the material composing the same, while in molten state, to fill a groove and intersecting anchor holes 8 provided in the lower edge of the plate, just as in pouring a journal box. When it is desired to replace a shoe, the worn one is melted out and a new one poured.

Such strip 7 will also be desirably made of a metal, e. g. bronze, nickel or nickel alloy, specially selected because of its wearing characteristics when pressed into contact with the surface of the roll.

Figure 3:
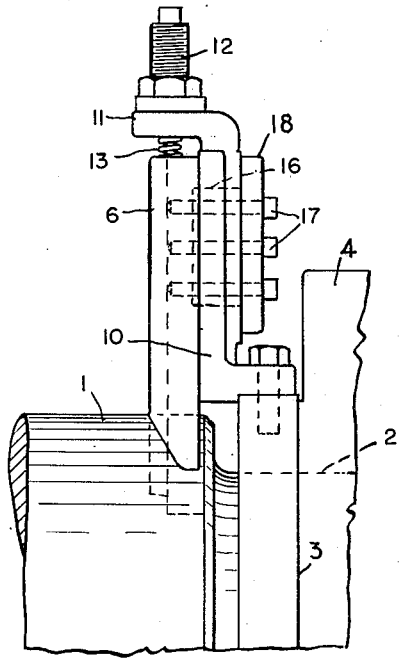
Fig. 3 is an end elevation of the same as viewed from the right in Fig. 1.
Figure 4:
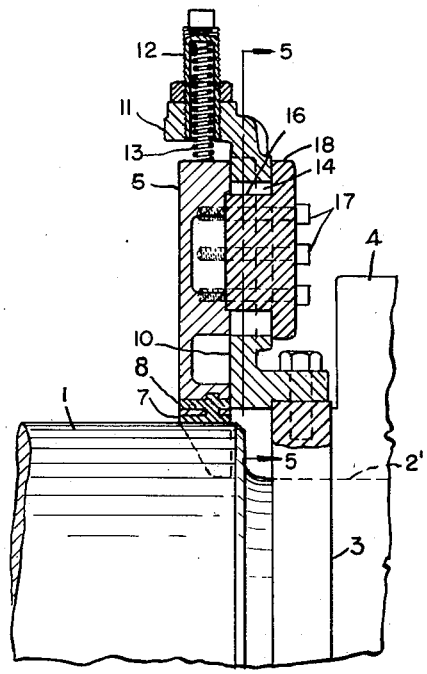
Fig. 4 is a central vertical section to one of said guides and the mounting therefor, the plane of the section being indicated by line 4—4 on Figs. 1 and 2 respectively.

For the purpose of supporting the respective guide plates there is fixedly mounted on the journal box in housing 4 adjacent the end of the corresponding roll an upstanding bracket 10, the upper end 11 of which lies above and overhangs the corresponding plate, with a certain amount of clearance being left therebetween, as best shown in Figs. 3 and 4. Threadedly mounted in such overhanging bracket end so as to be vertically adjustable is a casing 12 in which is housed a compression spring 13, the lower free end of which contacts with the upper edge of the corresponding plate and exerts a downward pressure thereon, i. e. pressure in a direction radial to the axis of the roll with which the plate contacts.

Figure 5:
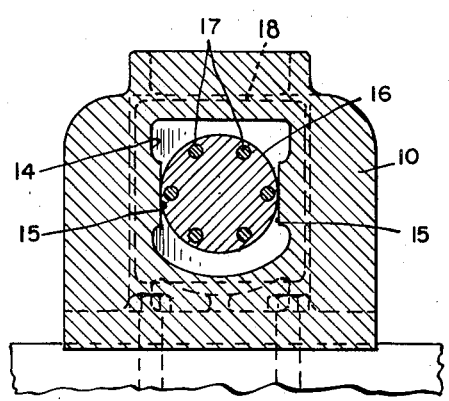
Fig. 5 is a section taken on a plane transverse to that of Fig. 4, as indicated by the line 5—5 on said figure.

Such plate is attached to the bracket by means which permit it to move not only in such radial direction but also to oscillate in its own plane transversely of the roll axis. To this end the bracket is formed with a vertically elongated slot 14 (see Fig. 5) having opposite parallel faces 15, 15 between which is held a projecting boss 16 fastened to the rear face of the corresponding guide plate, such boss being conveniently provided as a part of a separate member which is secured to the plate by means of bolts 17 and has a flange 18 that completely overlies the slot 14 in the bracket. From the construction just described it will be seen that the guide plate will be guided in its vertical movement, i. e. radially of the axis of the corresponding roll, by engagement of said boss 16 with the opposed parallel faces 15 of the slot 14 while at the same time said plate is left free to oscillate in the manner previously referred to.

Figure 6:
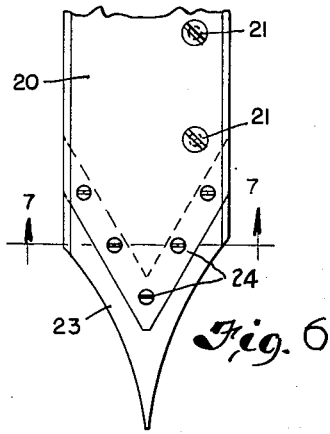
Fig. 6 is a broken elevational view of the means whereby the respective guides are connected together.
Figure 7:
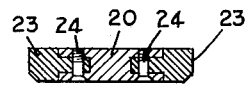
Fig. 7 is a transverse section of such means, the plane of the section being indicated by line 7—7, Fig. 6.

Seated in the inwardly directed recessed or rabbeted edges of the guide plates 5 and 6 so as to close the space therebetween despite any movement of said guide plates relatively to each other is a bridge plate 20, the detailed construction of which is shown in Figs. 6 and 7. Said bridge plate is secured to the edge of the one guide plate (plate 6 as illustrated in Figs. 1 and 2) by means of a series of bolts 21 that extend through the edge of the guide plate and carry compression springs 22 so that while such bridge plate is normally held in close fitting contact with the edge of the guide plate it may be displaced should the one guide plate be forced out of alignment with the other. However, normally said bridge plate will be held in close contact not only with the rabbeted edge of the guide plate to which it is thus attached but also in similar close contact with the adjacent edge of the other guide plate.

The lower end of bridge plate 20 will desirably be of V-shape and firmly secured thereto, in the same manner as shoes 7 are secured to plates 5 and 6, by means of screws 24 is a shoe 23 having its opposite sides concavely curved to correspond with the curvature of the adjacent strips or shoes 7 on the two guide plates. In other words, the sides of such shoe 23 conform in curvature with the roll surfaces and thus serve substantially completely to close off the space between the two rolls.

It will be understood that if desired shoe 23 may be secured to bridge plate 20 in the same manner as shoes 7 are secured to plates 5 and 6, and that, vice versa, the latter may be attached by means of screws instead of by casting, as described above.

From the foregoing description of the construction and mounting of our improved guide plates it will be seen that not only is an effective closure thereby provided at the ends of the rolls despite changes in the relative position of the latter, whether due to operating conditions or wear in the roll bearings, but that the guide plates are capable of relative displacement without danger either of being broken themselves or breaking the mounting whereby they are supported.

At the same time the plates are mounted in such manner as to facilitate their attachment or removal as may be required, and should the roll contacting edges thereof become unduly worn the shoes both on the main plates 5 and 6 and on the bridge plate 20 may be readily replaced.

It will be understood that while our improved guides, as shown and described, are particularly useful in conjunction with a pair of rolls such as are employed in a conventional rubber mill, our method of supporting a guide plate so as to have slidable, pivotal movement in its own plane, and thus in effect have floating contact with the roll, whereby close contact is maintained with the latter despite the displacement to which it is subjected, is not limited to such specific installation. In other words, a guide may be advantageously thus mounted where applied to a single roll or to more than two rolls, as for example in a three-roll mill.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In mechanism of the character described, the combination of a guide-plate having an arcuate, roll-contacting edge, and a support for said plate, said plate and support being formed with relatively slidable and rotatable interfitting portions providing a sliding and pivotal mounting of said plate on said support along a path generally radially relative to the axis of such edge and about an axis parallel to the axis of such edge, respectively.

2. In mechanism of the character described, the combination of a guide-plate having an arcuate, roll-contacting edge, a support for said plate, said plate and support being formed with relatively slidable and rotatable interfitting portions providing a sliding and pivotal mounting of said plate on said support along a path generally radially relative to the axis of such edge and about an axis parallel to the axis of such edge, respectively, and a spring between said plate and support urging said plate in the direction of such edge thereof.

3. The combination of a housing provided with a journal box, a mill roll journalled at its end in said journal box, a bracket mounted on the latter and extending radially of the axis of said roll, a guide plate disposed transversely of said roll and having an arcuate edge adapted to contact with the latter, said plate and bracket being formed with relatively slidable and rotatable interfitting portions providing a sliding and pivotal mounting of said plate on said support along a path generally radially relative to the axis of such edge and about an axis parallel to the axis of such edge, respectively.

4. The combination of a housing provided with a journal box, a mill roll journalled at its end in said journal box, a bracket mounted on the latter and extending radially of the axis of said roll, a guide plate disposed transversely of said roll and having an arcuate edge adapted to contact with the latter, said plate and bracket being formed with relatively slidable and rotatable interfitting portions providing a sliding and pivotal mounting of said plate on said support along a path generally radially relative to the axis of such edge and about an axis parallel to the axis of such edge, respectively and a spring between said bracket and plate normally pressing the latter towards said roll.

5. The combination of a housing provided with a journal box, a mill roll journalled at its end in said journal box, a bracket mounted on the latter adjacent such roll end, a guide plate disposed transversely of said roll and having an arcuate edge adapted to contact with the latter, and a boss on said plate extending parallel with the axis of said roll, said bracket having a slot fitted to said boss and extending radially of the axis of said roll, whereby said plate may have sliding and pivotal movement in its own plane relatively to said bracket.

6. The combination of a housing provided with a journal box, a mill roll journalled at its end in said journal box, a bracket mounted on the latter adjacent such roll end, a guide plate disposed transversely of said roll and having an arcuate edge adapted to contact with the latter, and a boss on said plate extending parallel with the axis of said roll, said bracket having a slot fitted to said boss and extending radially of the axis of said roll, whereby said plate may have sliding and pivotal movement in its own plane relatively to said bracket, and a compression spring interposed between the outer end of said bracket and said plate and tending to press the latter towards said roll.

7. The combination of a housing provided with two parallel relatively transversely adjustable journal boxes, a pair of coacting mill rolls having their ends journalled in said journal boxes, respectively, a guide plate disposed transversely of each roll adjacent such end thereof and having an arcuate edge adapted to contact with said roll, said plates and journal boxes being formed with approximately aligned relatively slidable and rotatable interfitting portions, such interfitting portions of each plate and the respective journal box being relatively slidable along a path generally radially relative to the axis of the arcuate edge of the plate and relatively rotatable about an axis parallel to the axis of such edge.

8. The combination of a housing provided with two parallel relatively transversely adjustable journal boxes, a pair of coacting, relatively displaceable mill rolls having their ends journalled in said journal boxes, respectively, a guide plate disposed transversely of each roll adjacent such end thereof and having an arcuate edge adapted to contact with said roll, said plates and journal boxes being formed with approximately aligned relatively slidable and rotatable interfitting portions, such interfitting portions of each plate and the respective journal box being relatively slidable along a path generally radially relative to the axis of the arcuate edge of the plate and relatively rotatable about an axis parallel to the axis of such edge, and a bridge plate attached to the inner lateral edge of one of said plates and overlapping the juxtaposed lateral edge of the other.

9. The combination of a housing provided with two parallel relatively transversely adjustable journal boxes, a pair of coacting, relatively displaceable mill rolls having their ends journalled in said journal boxes, respectively, a guide plate disposed transversely of each roll adjacent such end thereof and having an arcuate edge adapted to contact with said roll, said plates and journal boxes being formed with approximately aligned relatively slidable and rotatable interfitting portions, such interfitting portions of each plate and the respective journal box being relatively slidable along a path generally radially relative to the axis of the arcuate edge of the plate and relatively rotatable about an axis parallel to the axis of such edge, and a bridge plate overlapping the juxtaposed lateral edges of said guide plates and attached to one of said plates, and springs yieldably holding said bridge plate against said guide plates.

10. The combination of a housing provided with two parallel relatively transversely adjustable journal boxes, a pair of coacting, relatively displaceable mill rolls having their ends journalled in said journal boxes, respectively, a guide plate disposed transversely of each roll adjacent such end thereof and having an arcuate edge adapted to contact with said roll, said plates and journal boxes being formed with approximately aligned relatively slidable and rotatable interfitting portions, such interfitting portions of each plate and the respective journal box being relatively slidable along a path generally radially relative to the axis of the arcuate edge of the plate and relatively rotatable about an axis parallel to the axis of such edge, the juxtaposed lateral edges of said plates being recessed, and a bridge plate overlapping the juxtaposed lateral edges of said guide plates and attached to one of said plates, and springs yieldably holding said bridge plate against said guide plates.

11. In mechanism of the character described, the combination of a guide-plate member having an arcuate, roll-contacting edge, a support member for said plate member, one of said members being formed with an elongated slot disposed generally radially relative to the axis of such arcuate, roll-contacting edge, and a projection on the other of said members extending generally parallel to the aforesaid axis and having a radially slideable and rotatable fit in such slot.

12. In mechanism of the character described, the combination of a guide-plate member having an arcuate, roll-contacting edge, a support member for said plate member, one of said members being formed with an elongated slot disposed generally radially relative to the axis of such arcuate roll-contacting edge, a projection on the other of said members extending generally parallel to the aforesaid axis and having a radially slideable and rotatable fit in such slot, and resilient means urging said plate member in the direction of such edge thereof.

13. In mechanism of the character described, the combination of a guide-plate having an arcuate, roll-contacting edge, and a support for said plate, said plate and support being formed with interfitting portions including a guideway with opposed parallel sides extending generally radially relative to the axis of such edge, and a cylindrical projection extending axially in a direction parallel to the axis of such edge and slidable transversely of and rotatable about its own axis in such guideway.

EDMUND M. WINEGAR.
ANTHONY P. GROVER.

REFERENCES CITED

The following references are of record in the file of this patent:

UNITED STATES PATENTS

| Number | Name | Date |
|---|---|---|
| 1,341,422 | Gaisman | May 25, 1920 |
| 1,538,179 | Dixon | May 19, 1925 |
| 2,308,972 | Hasson | Jan. 19, 1943 |